United States Patent [19]

Saylor

[11] 4,215,524
[45] Aug. 5, 1980

[54] MEMBRANE PACKAGING MACHINE

[75] Inventor: R. Glenn Saylor, West Covina, Calif.

[73] Assignee: C. R. Bard, Inc., Murray Hill, N.J.

[21] Appl. No.: 7,362

[22] Filed: Jan. 29, 1979

[51] Int. Cl.² ............................................. B65B 9/02
[52] U.S. Cl. ...................................... 53/554; 53/555; 53/559; 53/574
[58] Field of Search ................. 53/548, 559, 553, 554, 53/555, 389, 574

[56] References Cited

U.S. PATENT DOCUMENTS

| | | | |
|---|---|---|---|
| 25,839 | 8/1865 | Stroop | 29/16 R |
| 2,141,318 | 12/1938 | Salfisberg | 53/450 |
| 2,166,643 | 7/1939 | Salfisberg | 53/526 |
| 2,245,827 | 6/1941 | Salfisberg | 53/415 |
| 2,350,930 | 6/1944 | Salfisberg | 53/413 |
| 2,420,983 | 5/1947 | Salfisberg | 53/436 |
| 2,533,554 | 12/1950 | Byerly | 206/527 |
| 2,606,412 | 8/1952 | Salfisberg | 53/451 |
| 2,759,308 | 8/1956 | Nawrocki | 53/122 |
| 3,245,197 | 4/1966 | Van Mil, Jr. et al. | 53/453 |
| 3,330,090 | 7/1967 | Court et al. | 53/450 |
| 3,377,773 | 4/1968 | Clark | 53/546 |
| 3,596,428 | 8/1971 | Young et al. | 53/451 |
| 3,611,671 | 10/1971 | Skinner et al. | 53/495 |
| 3,777,451 | 12/1973 | Larson et al. | 53/553 |
| 4,067,173 | 1/1978 | Borrello | 53/553 |
| 4,077,186 | 3/1978 | Voegele | 53/451 |

Primary Examiner—Horace M. Culver
Attorney, Agent, or Firm—Wills, Green & Mueth

[57] ABSTRACT

An apparatus for packaging a substance in closed bags formed from two continuous ribbons of a thin fragile material in which the ribbons are sealed to each other as they pass downwardly between first and second pairs of horizontal nipping rollers. A bag open at the top is produced from a portion of the ribbons by sealing and is filled with a predetermined amount of the substance to be packaged. The top of the bag is subsequently sealed to close the bag after the ribbons have advanced downwardly a predetermined distance. These operations take place sequentially on successive portions of the ribbons as they advance toward the second pair of nipping rollers, forming a series of sealed bags. At least one of the first pair of nipping rollers has a generally smooth annular concave portion extending between the end portions thereof, while at least one of the second pair of nipping rollers has a generally cylindrical portion of reduced diameter extending between its end portions. Rotation of the rollers about their respective axes is controlled to advance the ribbons in a desired manner. The two ribbons approach the first pair of rollers generally horizontally from opposite sides. They pass over and partially around the rollers to the point of nipping engagement, from which they proceed downwardly toward the second set of rollers. The portions of the two ribbons above the first pair of rollers are tensioned away from those rollers to pull the ribbons into the concave portions, preforming the ribbons at that point and for a substantial distance therebelow into a generally tubular shape. A conduit for introducing the substance to be packaged into each of the open bags extends downwardly between the first pair of rollers.

17 Claims, 10 Drawing Figures

MEMBRANE PACKAGING MACHINE

BACKGROUND OF THE INVENTION

1. Field of the Invention

This invention relates to the packaging art and more particularly to a machine for packaging a substance in closed bags formed from two continuous ribbons of a thin fragile material.

In the medical field, for instance, it is sometimes desirable to include a small bag containing a chemical diffusible therethrough within a blood bag to maintain the pH of the blood in the blood bag. The desired level of diffusibility through the walls of the smaller bag may be obtained by constructing the bag of a very thin polycarbonate membrane, however, such membranes are extremely fragile and must be handled with great care to avoid damage.

2. Description of the Prior Art

Various machines have been proposed for forming and filling packages from a pair of continuous ribbons. Machines of this type are described in U.S. Pat. Nos. 2,166,643, 2,245,827, 3,350,930, 2,420,983, 2,606,412 and 2,759,308. However, the machines disclosed in those patents are unsatisfactory for forming packages from very thin fragile membranes, such as polycarbonate membranes, for a variety of reasons. In the first place, the machines of the listed patents allow substantial contact between the conduit filling the packages and the membrane itself. The prior machines also do not satisfactorily preform the membranes. The membranes are either not preformed into a bag shape at all or are subjected to substantial stress as they are so formed. Very thin polycarbonate membranes are able to withstand only very slight stress and may be damaged if made into a bag and then filled without being preformed to the desired contour or preformed in too stressful a manner.

It is also generally desirable to reduce the amount of air within a package formed from two ribbons to a bare minimum. This is particularly true to the case of polycarbonate bags to be included within blood bags. While some of the machines disclosed in the listed patents may eliminate undesired air deposits within the bags, this is done in the context of mechanisms which are unsatisfactory for use with polycarbonate or other very thin fragile membranes.

Thus, there has been a need for an improved machine able to form and fill packages from two ribbons of a very thin fragile material.

SUMMARY OF THE INVENTION

Accordingly, it is an object of the present invention to provide an improved machine for forming and filling closed packages from two ribbons of a very thin fragile material without damaging that material.

It is another object of the present invention to provide a machine for forming and filling packages from two ribbons of a very thin fragile material in which contact between the ribbons and the conduit through which the packages are filled is minimized.

It is yet another object of the present invention to provide a machine for forming and filling packages from two ribbons of a very thin fragile material in which the ribbons are formed prior to being sealed together.

It is still another object of the present invention to provide an improved machine for forming and filling packages with a minimum of air trapped therein from two ribbons of a very thin fragile material.

The above, and other objects of the present invention are achieved by providing an apparatus for packaging a substance formed from two continuous ribbons of a thin fragile material comprising first and second rollers directed along a first horizontal plane and circumferentially engageable in opposed nipping relationship at axially outer end portions thereof to confine two ribbons therebetween, at least one of said rollers having a generally smooth annular concave portion extending between said end portions, the two ribbons approaching said first and second rollers generally horizontally from opposite sides thereof with each of the ribbons passing over and partially around one of said rollers to a first location between said rollers, whereupon the ribbons are brought face to face with one another and nipped in that condition between the axially outer end portions of said first and second rollers; third and fourth rollers directed along a second horizontal plane and spaced beneath said first and second rollers, said third and fourth rollers circumferentially engageable in opposed nipping relationship at axially outer end portions thereof with at least one of said rollers having a generally cylindrical portion of reduced diameter extending between said end portions thereof, the ribbons passing downwardly from said first and second rollers to a second location at which the ribbons are nipped between the axially outer end portions of said third and fourth rollers; means for controlling the rotation of said rollers about their respective axes to advance the ribbons in a desired manner from said first location to said second location as the ribbons are held taught therebetween; means for tensioning the two ribbons above said first location in a direction away from said first location, pulling each of the ribbons over a different one of said first and second rollers and pulling at least one of the ribbons into said at least one concave portion to preform the unsealed combination of the ribbons at said first location and for a substantial distance therebelow into a generally tubular shape; means for periodically sealing the ribbons to each other as the ribbons pass from said first location to said second location, forming a bag open at the top from a portion of the ribbons and subsequently sealing said top to close the bag after the ribbons have advanced downwardly a predetermined distance, said sealing means operating sequentially on successive portions of the ribbons as the ribbons advance toward said second location to form a series of sealed bags; and means for introducing a substance directly into each of the open bags, comprising a conduit extending downwardly between said first and second rollers in the space formed by said at least one concave portion, said conduit located between and generally spaced from the preformed ribbons to prevent damage thereto, and means for causing a predetermined amount of the substance to pass from said conduit to each of the bags between the time of bag formation and that of sealing.

The sealing may be accomplished by a pair of platens parallel to the ribbons and directed toward the ribbons from opposite sides thereof. The platens are actuated toward each other to sandwich the ribbons therebetween and apply a predetermined sealing force, and possibly heat, thereto. At least one of the sealing platens may be provided with sealing lines to first form a bag open at the top and then to close that bag. The sealing lines may take the form of a "U"-shaped line for forming an open bag positioned over a generally horizontal line for closing a bag. An open bag formed during one cycle of the apparatus is thus closed during the next cycle after being advanced downwardly from its prior position. The very same sealing motion forms one bag as it closes another. The area of the platens adjacent the "U"-shaped sealing line may be recessed to a contour substantially the same as the axial cross section of the recess in at least one of the first pair of rollers to maintain the preformed contour of the ribbons and to provide clearance for the filler conduit regardless of whether the platens are open or closed. The ribbons thus maintain their preformed shape and are not subjected to unnecessary contact or manipulation relative to the filler conduit or the platens.

A cutting apparatus may be provided for severing the sealed bags from the downwardly advancing ribbons as those bags pass through the second pair of rollers. The cutting apparatus may comprise a knife blade oriented transversely across the ribbons and advanced toward the ribbons by automatically actuated wedge means. The knife blade of this apparatus therefore moves across the ribbons to be cut as it moves through those ribbons, resulting in a smooth and positive cutting of even very thin ribbons.

BRIEF DESCRIPTION OF THE DRAWINGS

The above and other objects of the present invention may be fully understood from the following detailed description taken together with the accompanying drawings wherein similar reference characters refer to similar elements throughout and in which.

DESCRIPTION OF THE PREFERRED EMBODIMENTS

The present invention comprises an improved machine for forming and filling packages from two very thin fragile ribbons without damaging the ribbons and without trapping unnecessary air within the packages. While the invention will be described herein in the context of a machine for performing discrete operations in a predetermined sequence and utilizing a pair of platens to seal the ribbons while the ribbons are in a stationary condition, these teachings are applicable as well to other machines or methods for forming packages from a pair of ribbons. Advancement of ribbons in such machines may be either sequential or continuous, and the apparatus may be controlled in any of a variety of manners known in the art. The sealing operation may also be performed in any known manner.

Figure 1:
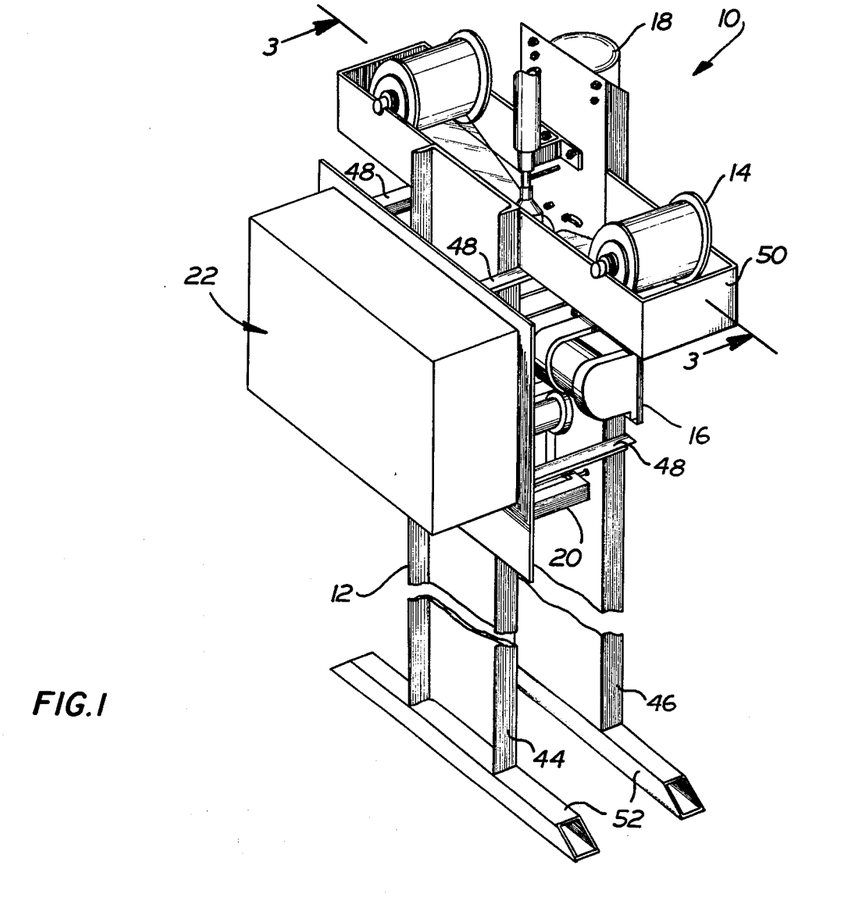
FIG. 1 is a perspective view of the apparatus constructed in accordance with the present invention.

Referring now to the drawings there is illustrated in FIG. 1 the structure associated with a preferred embodiment of the present invention, generally designated 10. The embodiment 10 comprises generally a frame 12, a ribbon advancement apparatus 14, a ribbon sealing apparatus 16, a filler apparatus 18, a cutting apparatus 20 and a control box 22.

Figure 2:
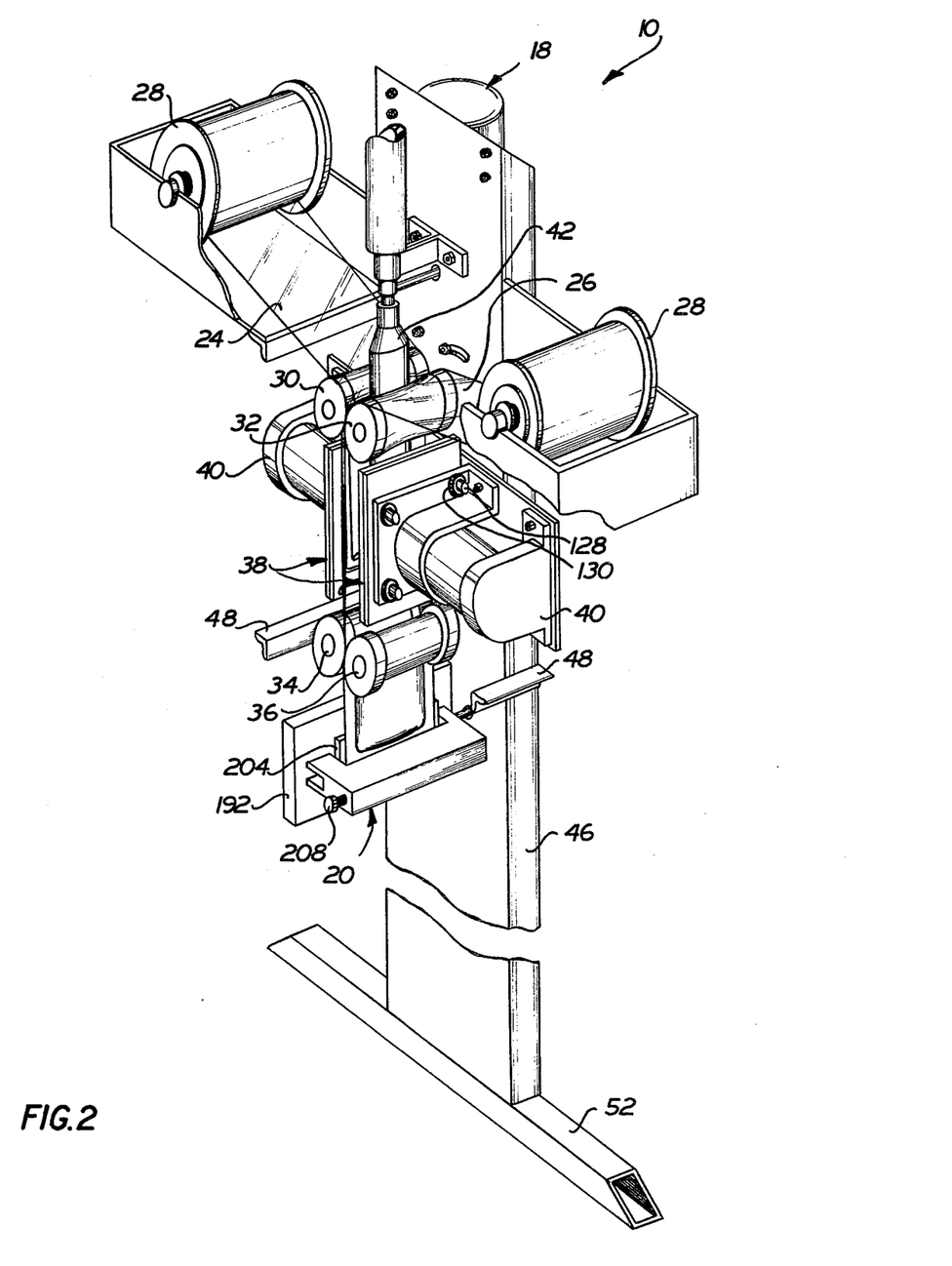
FIG. 2 is an enlarged perspective view, partially broken away, of the apparatus shown in FIG. 1.

As shown more clearly in FIG. 2, the ribbons 24 and 26 are fed from supply rollers 28 in a generally horizontal condition toward concave nipping rollers 30 and 32. The ribbons 24 and 26 pass over and partially around the nipping rollers 30 and 32, respectively, to a point between the rollers at which the ribbons are held snugly together at their outer edges in face to face relationship. The ribbons 24 and 26 pass downwardly from this location to a condition of engagement between lower nipping rollers 34 and 36, and through the cutting apparatus 20. As described hereinafter, the ribbons are held taught between the rollers 30 and 32 and the rollers 34 and 36. The ribbon sealing apparatus 16 is located between the upper and lower sets of nipping rollers, and comprises generally a pair of platen arrangements 38 parallel to the ribbons and facing each other from opposite sides thereof. Platen arrangements 38 are actuable toward each other in sealing relationship by piston and cylinder assemblies 40 to sandwich the ribbons 24 and 26 therebetween.

The ribbons 24 and 26 are tensioned over the nipping rollers 30 and 32 by the supply rollers 28, causing the ribbons 24 and 26 to assume the shape of the exterior of the rollers 30 and 32 at the location of the rollers and for substantial distance downwardly therefrom. The face to face combination of the ribbons 24 and 26 in the area between the platen arrangements 38 is therefore formed into a generally tubular shape by the concave rollers 30 and 32 prior to any sealing operation. This preforming of the ribbons provides clearance for a fill tube 42 of the filler apparatus 18 to extend between the rollers 30 and 32 through the opening by the concave recesses therein and to extend downwardly from there to a point between the platen arrangements 38 while remaining substantially out of contact with the two ribbons. It also enables the bag-shaped container to be formed wrinkle free by actuation of the platen arrangements 38 toward each other.

As seen best in FIG. 1, the frame 12 comprises a pair of parallel vertical beams 44 and 46 joined together by a plurality of transverse braces 48. A horizontal tray 50 containing the supply rollers 28 is mounted between the vertical beams 44 to 46 toward the upper end thereof, and the control box 22 is mounted on the front of the frame 12 in spaced relationship to the vertical beam 44 by portions of the transverse braces 48 extending beyond the vertical beams. The filler apparatus 18 is mounted to a portion of the vertical beam 46 extending above the tray 50. Stable footing for the frame 12 is provided by a pair of elongated horizontal tubes 52 secured to the base of the vertical beams 44 and 46.

Figure 3:
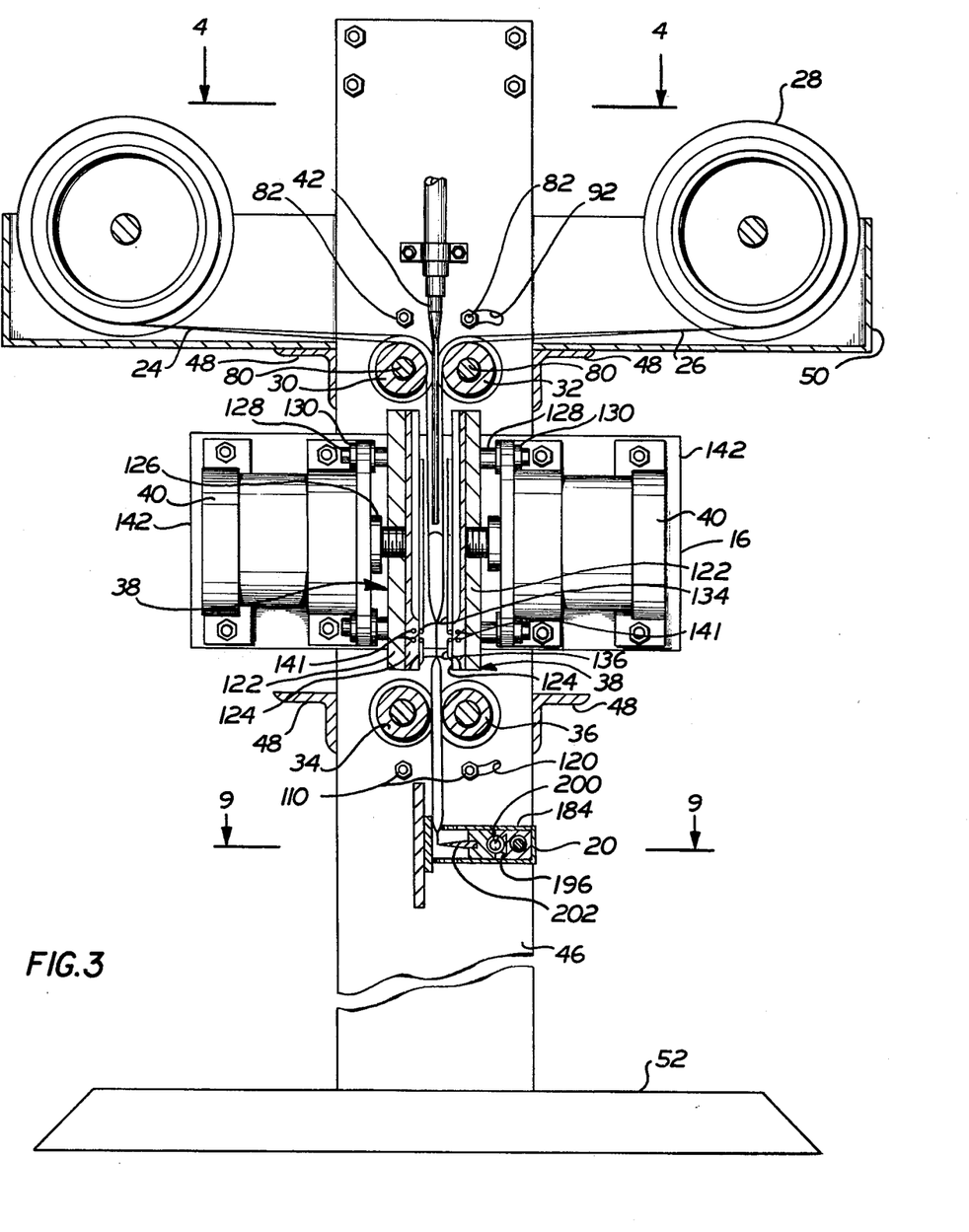
FIG. 3 is a vertical sectional view taken in the direction 3—3 of FIG. 1.
Figure 4:
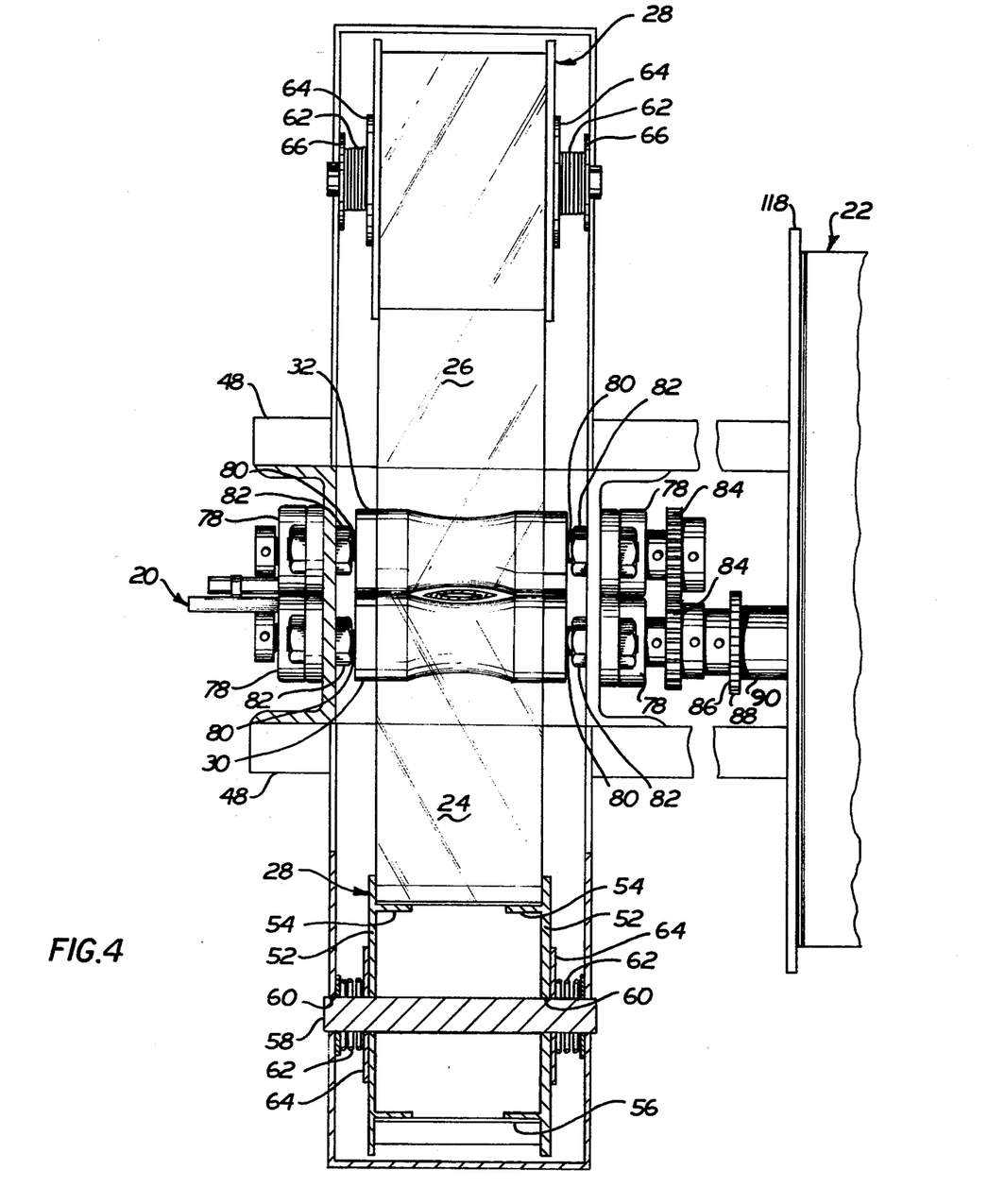
FIG. 4 is a horizontal sectional view of the apparatus constructed in accordance with the present invention taken along the line 4—4 of FIG. 3.

Turning now to FIGS. 3 and 4, the supply rollers 28 comprise a pair of roller end plates 52 having annular flange portions 54 receivable within the two end openings of a cylindrical element 56. The membrane material is wound on the cylindrical element 56 and the roller end plates are carried by a shaft 58 journalled transversely across the horizontal tray 50 within notches 60 therein.

The ribbons 24 and 26 are fed to the concave nipping rollers 30 and 32 from the bottom of the supply rollers 28 in a genrally horizontal direction. The supply rollers 28 are provided with mechanism for maintaining the tension of the ribbons 24 and 26 over the rollers 30 and 32. The mechanism accomplishing that result in this embodiment of the invention is a simple spring-type drag structure comprising axially wound springs 62 along the shafts 58 pressing washers 64 against the roller end plates 52. A force tending to unwind the ribbons must therefore overcome the friction resulting from the force of the springs against the washers 64, and will thus result in the ribbons being tensioned as they are unwound. To insure smooth operation, a second washer 66 is provided between the springs 62 and the walls of the tray 50.

Alternatively, the ribbons 24 and 26 may be tensioned by any other appropriate mechanism. Such mechanisms are well-known in the art and will not be treated in further detail herein.

Figures 6, 7, 8:
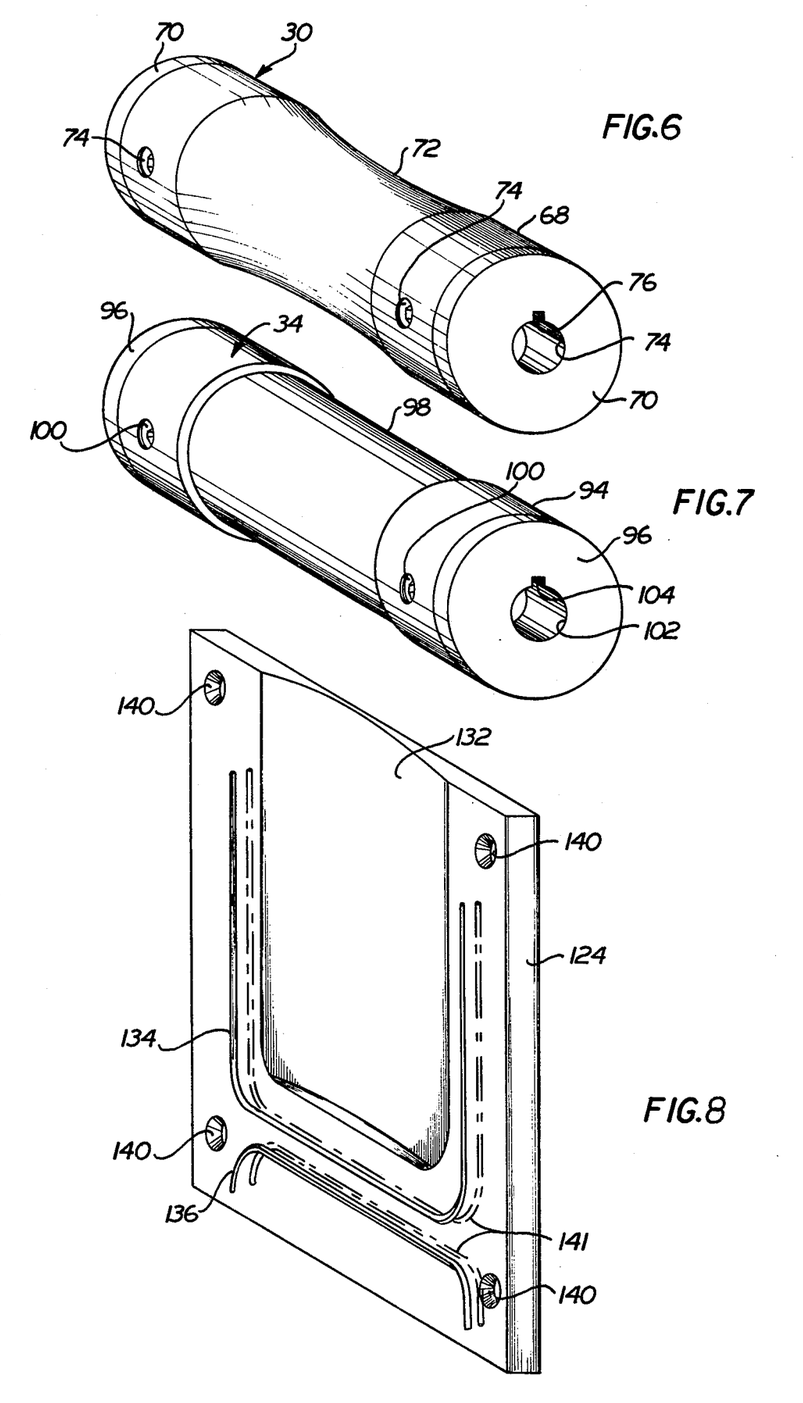
FIG. 6 is an isolated perspective view of a concave nipping roller constructed in accordance with the present invention.
FIG. 7 is an isolated perspective view of a nipping roller having a portion of reduced diameter constructed in accordance with the present invention.
FIG. 8 is an isolated perspective view of a sealing platen constructed in accordance with the present invention.

The concave nipping roller 30, illustrated in FIG. 6, comprises a hollow body 68 having interfitting end caps 70. The body 68 is provided at its midpoint with an outwardly facing concave annular recess 72 which is machined or otherwise formed therein. The recess 72 is relatively broad and shallow, producing a smooth contour over which the thin delicate ribbon 24 can be tensioned without damage to the ribbon. The end caps 70 are provided with annular portions extending within the open ends of the body 68 and retained therein by set screws 74. The end caps 70 are also provided with aligned axial openings 74 having key ways 76 enabling the roller 30 to be mounted to and driven by a shaft.

The roller 32 in the embodiment 10 is identical to the roller 30 described above, however, it is by no means necessary that this be the case. It is anticipated that in some circumstances it will be desirable to provide the rollers 30 and 32 with differently shaped recesses, and possibly to eliminate the recess in one of the rollers entirely.

Figure 5:
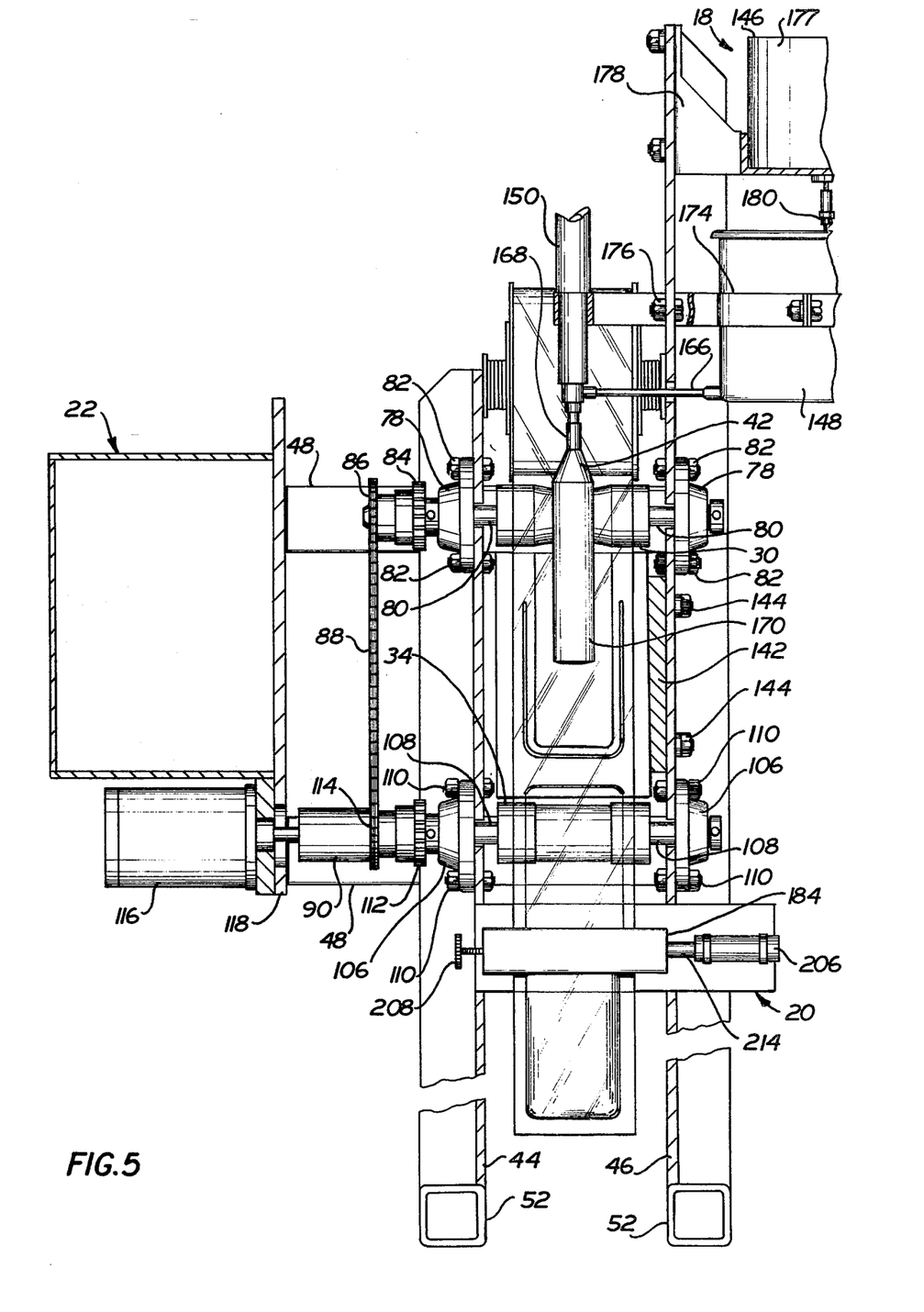
FIG. 5 is a vertical sectional view of the apparatus of the present invention taken along the line 5—5 of FIG. 4.

As seen best from FIGS. 4 and 5, the rollers 30 and 32 are mounted for rotation relative to the vertical beams 44 and 46 by bearing elements 78 carrying axial shafts 80. The axle shafts 80 pass through the openings 74 in the rollers and are keyed to the key ways 76 therein. The bearing elements 78 are secured to the vertical beams 44 and 46 by bolts 82 passing through flanges in the bearing elements on opposite of the axle shafts 80.

The rollers 30 and 32 are directly opposed to each other, with the axially outer end portions thereof engaging the ribbons 24 and 26 in nipping relationship. The rollers are caused to rotate oppositely at equal angular speeds by a pair of similar axial gears 84 engaging each other and rotating with the individual axial shafts 80. The gear 84 driving the roller 30 is also provided with a coaxial chain sprocket 86 engaging a chain 88. The upper bolts 82 associated with the roller 32 pass through arcuate slots 92 of the vertical beams 44 and 46, as shown in FIG. 3. The slots 92 enable the roller 32 to be swung away from the roller 30, pivoting about the axis of the lower bolts 82. The roller 32 is thus brought out of engagement with the roller 30 and the corresponding axial gears 84 associated with the two rollers are disengaged. This enables the ribbons 24 and 26 to be easily threaded through the nipping rollers 30 and 32 to initially set up the machine.

FIG. 7 shows the lower nipping roller 34 in isolation as comprising a hollow body 94 having interfitting end caps 96. The hollow body 94 is provided with a generally cylindrical portion of reduced diameter 98 midway between its ends, forming an annular recess therein. The end caps 96 are provided with annular flanges engaging the open ends of the hollow body 94 and secured therein by set screws 100. Aligned axial openings 102 in the end caps are provided with key ways 104. The roller 36 is identical to the roller 34 in this embodiment of the invention, however, variations in this relationship are possible in the same way as discussed above in regard to the concave recesses of the rollers 30 and 32.

As seen best in FIG. 5, the rollers 34 and 35 are mounted to the vertical beams 44, 46 of the frame 12 by bearing elements 106 which are similar to the bearing elements 78 discussed above. The rollers 34 and 36 are carried on axle shafts 108 keyed within the openings 102 of the rollers, and passing through the bearing elements 106. The bearing elements 106 are themselves attached to the main beams 44 and 46 by bolts 110 positioned oppositely about the axle shafts 108. The rollers 34 and 36 are engageable to rotate together in opposite directions through axial gears 112 fixed to the axle shafts 108 at a point directly below the axial gears 84 of the rollers 30 and 32. The axial gear 112 of the roller 34 is in turn coupled to a coaxial sprocket 114 engaged with the chain 88. The sprocket 86 of the roller 30 is thus driven synchronously with the sprocket 114 of the gear 134, resulting in synchronized nipping rotation of the rollers 30, 32, 34 and 36. The sprocket 114 is itself driven by a stepping motor 116 through a drive collar 90. The stepping motor 116 is mounted to a backing plate 118 associated with the control box 22. As shown in FIG. 3, the lower bolts 110 associated with the roller 36 pass through arcuate slots 120 in the vertical beams 44 and 46. The roller 36 can thus be swung away from the roller 34 about its upper bolts 110 to facilitate threading in the same manner as the roller 32 is swung away from the roller 30.

It will be understood that the operation of the present invention may be altered as desired by changing the relative radiuses or recess contours of the various nipping rollers or by changing the relative diameters of the gears 84 and 112, as well as the relative diameters of the sprockets 86 and 114, without departing from the spirit of the invention. Such variations may result in bags of different shapes by preforming the ribbons 24 and 26 in different ways and differently tensioning the ribbons between the upper rollers 30 and 32 and the lower rollers 34 and 36. In the preferred embodiment of the present invention, however, the gearing is as described herein and the diameter and contour of the rollers engaging each other are the same. The ribbons 24 and 26 in the preferred embodiment of the present invention are initially set up in a taught condition between the upper rollers 30 and 32 and the lower rollers 34 and 36, and are thus held in that condition as they are advanced through the apparatus. The cross-sectional area of the recesses in the rollers 34 and 36 along planes containing their axes is also preferably less than the corresponding cross-sectional area of the annular recesses in the rollers 30 and 32.

The ribbons 24 and 26 in the present invention are sealed together by similar platen arrangements 38 actuated by piston and cylinder assemblies 40 to sandwich the ribbons therebetween. As seen in FIG. 3, each of the platen assemblies 38 comprises a base member 122 to which is affixed a platen face 124. The base member 122 may be threaded at its center directly to a piston shaft 126 of the piston and cylinder assembly 40 in a plane perpendicular to the axis of the piston shaft. The base 122 is also provided with a plurality of guide shafts 128 directed parallel to the piston shaft 126 on the same side of the base and received for sliding engagement within corresponding bushings 130 in the piston and cylinder assembly 40. The sliding engagement of the guide shafts 128 with the bushings 130 maintains the base member 122 accurately perpendicular to the axis of the piston shaft 126, while the piston shaft itself determines the position of the base member 122 along that axis. The piston and cylinder assembly 40 may be a double acting air cylinder able to move the base member 122 in either axial direction.

The platen face 124 affixed to the base member 122 on the side away from the piston and cylinder assembly 40 is shown in isolation in FIG. 8. The platen face 124 is a generally flat rectangular member having a relieved area 132 and two sealing lines 134 and 136 on its outer face 138. The relieved area 132 is similar in width and horizontal cross-sectional area to the axial cross-section of the annular groove 72 in the roller 30, and extends a substantial distance downwardly from the top of the platen face 124 along the center portion on the face 138. The sealing line 134 comprises a "U"-shaped line projecting outwardly from the face 124 to seal the two ribbons 24 and 26 together in the shape of an open bag. The sealing line 134 generally follows the perimeter of the relieved area 132 and is spaced therefrom. The sealing line 136 corresponds to a closure for the bag formed by the sealing line 134 and is located directly below the sealing line 134 on the face 138. The two platen faces 124 are therefore able to simultaneously form one open bag from the ribbons 24 and 26 and close another open bag formed previously from a portion of the ribbons directly therebelow. Advancement of the ribbons between closure of the platen faces 124 therefore enables a series of bags to be produced in open form and sealed in successive cycles of the apparatus. The platen face 124 is also provided with countersunk holes 140 extending therethrough for screwing, riveting or otherwise attaching the platen face 124 to the base member 122, without interfering with or damaging the ribbons sealed by the platen face.

The platen faces may also be provided with built-in electrical heating elements 141 associated with the seal lines 134 and 136 to provide the heat necessary for optimum sealing. The heating elements 141, while preferably of the impulse variety, may in some cases be heating coils designed to be powered continuously.

The location of the ribbon sealing apparatus 16 relative to the ribbons 24 and 26 and the two sets of nipping rollers is shown most clearly in FIGS. 3 and 5. The piston and cylinder assemblies 40 of the sealing apparatus 16 are provided with base plates 142 secured side by side in a vertical orientation to the beam 46 of the frame 12 by nut and bolt assemblies 144.

The ribbon sealing apparatus 16 is a modified version of an impulse sealer manufactured by the Vertrod Corporation as Model BF 5×8. The modification consists of incorporating the unique platen faces 124 having relieved areas 132 and the particular sealing lines 134 and 136. Impulse sealers available from Vertrod Corporation are self-contained units having built-in means for accurately controlling the time, pressure and temperature of sealing, and are designed to be triggered by an external signal to execute each sealing cycle. On being triggered, the platen arrangements 38 close about the ribbons 24 and 26 in sealing relationship and withdraw to their initial retracted condition when the sealing operation is complete. The ribbons are then advanced downwardly a predetermined distance by the stepping motor 116 before the sealing apparatus 16 is again triggered. The sealing apparatus 16 is thus cycled by an external triggering signal as the ribbons advance sequentially through the two pairs of nipping rollers.

Figure 10:
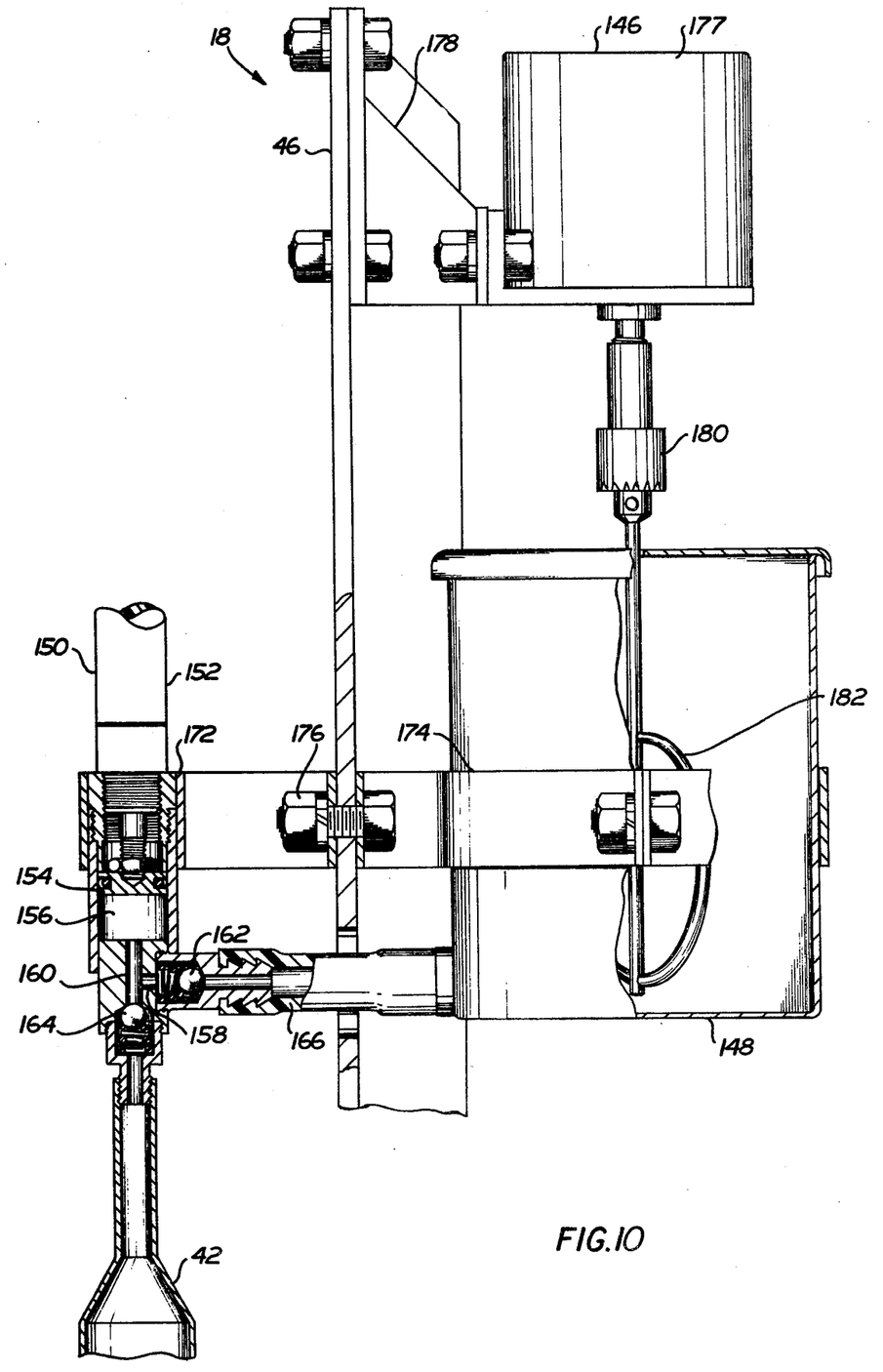
FIG. 10 is a fragmentary side elevational view, partially broken away, of a filling apparatus constructed in accordance with the present invention.

The filler apparatus 18 is shown in detail in FIGS. 5 and 10 to comprise agitating means 146, a bulk container 148 and an injection means 150. The injection means 150 comprises a double acting piston and cylinder assembly 152 driving an injection piston 154. The chamber 156 at the head of the piston 154 communicates with a supply passage 158 and an injection passage 160. The supply passage 158 is provided with a spring-loaded ball check valve 162 directed to allow fluid to pass into the chamber 156 through the supply passage 158 but not the opposite direction. The injection passage 160 is provided with a spring-loaded ball check valve 164 allowing fluid to pass along the injection passage 160 only away from the chamber 156. The supply passage 158 is connected by hose 166 to the interior of the container 148 such that the injection piston 154 is able to draw liquid from the container 148 to the chamber 156 by way of passage 158. The chamber 156 of the injection means 150 is charged in this way by actuation of the injection piston 154 to a retracted condition. The passage 160 is connected to the fill tube 42, allowing the fluid within the chamber 156 to be expelled through the fill tube 42 by the piston 154.

The injection means 150 is actuable in response to a triggering signal to actuate the piston 154 to expel the contents of the chamber 156 into the fill tube 42 and to retract automatically thereafter to draw additional liquid into the chamber from the container 148. The injection means is thus operable through a series of discrete cycles of operation by application of a series of triggering signals at the appropriate times.

The fill tube 42, as discussed above in relation to FIG. 2, extends downwardly between the nipping rollers 30 and 32 within the space provided by the annular recesses 72, and terminates at a point between the platen arrangements 38. As seen from FIGS. 4 and 5, the fill tube 42 is provided with a circular upper end 168 which flares out into an enlarged flattened portion 170 receivable within the annular recesses 72. The flattened portion 170 terminates at a location somewhere within the "U"-shaped sealing outlines of the platen faces 124, and thus within an open bag formed thereby. As discussed above, the tension of the ribbons 126 over the concave nipping rollers 30 and 32 preforms the rollers into a tubular shape spaced from the fill tube 42. This minimizes possibly destructive contact of the ribbons with the fill tube 42.

The injection means 150 and the container 148 are attached to the vertical beam 46 by a pair of yokes 172 and 174, respectively. The yokes 172 and 174 are themselves bolted to the vertical beam 46 by the nut and bolt assembly 176.

The agitating means 146 comprises an electric motor 177 bolted to the vertical beam 46 through a mounting bracket 178. The shaft of the motor drives a chuck 180 within which is mounted a stirring element 182 projecting downwardly into the open container 148. The motor 177 may be operated continuously to agitate the material to be injected into the bags.

Figure 9:
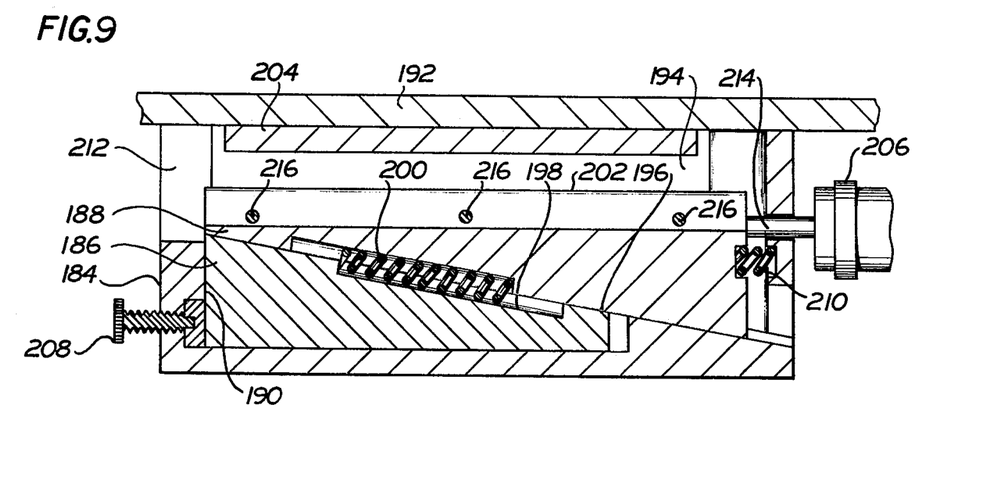
FIG. 9 is an isolated horizontal sectional view of a cutting apparatus constructed in accordance with the present invention, taken along the line 9—9 of FIG. 3.

The cutting apparatus 20 is located directly beneath the rollers 34 and 36 to sever the closed bags as they exit the rollers. The cutting portion of the apparatus 20 is shown in FIG. 9 to comprise generally a frame 184 carrying a pair of interlocking wedge members 186 and 188 slidable relative thereto in a slot 190 centered along a plane perpendicular to the direction of travel of the ribbons 24 and 26. The frame 184 includes a vertical backing plate 192 located parallel to and opposite the outer edge of the wedge element 188, defining an opening 194 for passage of the ribbons therebetween. The wedge members 186 and 188 are provided with longitudinal dove-tail means 196 along their wedge surfaces for relative sliding movement therebetween. Spring recesses 198 are provided in the wedge members along the dove-tail means 196 to receive a spring 200 urging the wedge members away from each other. Wedge surfaces of the wedge members 186 and 188 are equally sloped and oppositely directed, causing the two outer edges of the combination of the two wedge members to be parallel. The outer edge of the wedge member 188, which borders the opening 194, is provided with a knife blade 202 directed toward the opening. The surface of the backing plate 192 directly opposite the knife blade 202 may be provided with a cutting block 204 made of hard wood or other material suitable to receive the knife blade 202 in cutting relation without unduly damaging the blade.

A double acting piston and cylinder arrangement 206 is mounted to the backing plate 192 for actuation of the wedge member 188 relative to the wedge member 186. The axis of operation of the piston and cylinder arrangement 206 is parallel to the backing member 192. The wedge member 188 is thus actuable against the pressure of the spring 200 to slide relative to the wedge member 186 in a manner forcing the blade 202 across the opening 194. This causes the knife blade to cut simultaneously across and into the membrane, producing a clean, thorough cut. After the cutting operation is completed, the piston and cylinder arrangement 206 retracts and the wedge member 188 is returned to its original contracted condition by the spring 200.

The cutting depth may be adjusted by altering the location of the wedge member 186 within the slot 190. An adjusting screw 208 is provided within the frame 184 for this purpose. The adjusting screw engages the wider end of the wedge member 186 to force the wedge member 186 away from the end wall of the slot 190 against the force of the spring 200. This closes the opening 194 a corresponding amount and gives the blade 202 an increased reach across that opening. A second spring 210 may be provided at the opposite end of the frame 184 between the inner wall of the slot 190 and the larger end of the wedge member 188. The spring 210 thus serves to bias the wedge 188 against the spring 200 in the retracted condition of the blade 202. An opening 212 is also provided in the frame 184 to provide clearance for the smaller end of the wedge member 188 in the actuated condition of the cutting apparatus 20. The piston and cylinder arrangement 206 thus actuates a connecting rod 214 against the larger end of the wedge member 188 to force that member to slide relative to the wedge member 186, causing the blade 202 to move across the opening 194 in cutting relation. During this operation, the end of the wedge member 188 moves upwardly relative to the connecting rod 214, causing those elements to slide relative to each other. On completion of the cutting operation, the double acting piston and cylinder arrangement 206 withdraws the rod 214 and allows the spring 200 to retract the blade 202 by returning the wedge member 188 to its original position. A single complete cutting operation and retraction of the blade 202 constitutes a single cycle of the cutting apparatus 20, and the cutting apparatus 20 is adapted to execute one continuous cycle of operation each time an external triggering signal is received.

The blade 202 is shown attached to the wedge member 188 by a plurality of screws 216, facilitating removal and replacement of the blade 202 when it becomes dull. The cutting block 204 may also be easily replaceable. This ability to replace the blades and cutting blocks insures that cutting apparatus 20 will continue to produce accurate and complete cuts of the ribbons 24 and 26 over a long machine life.

It will be understood that the sequencing and operation of the various components of the embodiment 10 can be controlled in a variety of conventional ways. Examples of these vary from using simple limit switches to initiate successive operations to using sophisticated electronic timing devices initiating each of the operations. Such systems are well-known in the art and thus will not be discussed in detail herein.

The details of the control box 22 will not be discussed since the control box and its control panel will take on a somewhat different configuration depending on the sequencing method used. Control panels of this type are also well-known in the art.

Operation of the embodiment 10 involves integration of three separate operating cycles following each other in sequential fashion. The sealing and cutting operations may be performed at the same time and thus cycled together. In that case, the same initiating signal is used to control the ribbon sealing apparatus 16 and the cutting apparatus 20. After the sealing the cutting operations are completed, the open bag formed by the platen arrangements 38 is filled with a desired substance by the filler apparatus 18. The signal initiating this operation is directed to the injection means 150 since the agitating means 146 operates on a continuous basis. The ribbons are then advanced a predetermined amount sufficient to align the opening in the bag just formed with the lower sealing line 136 of the platen face 124. The ribbons are then positioned properly for another sealing and cutting operation. As this occurs, the top of the open bag previously formed is closed along the sealing line 136 and another open bag is formed directly thereabove. At this time another bag is severed from the continuous ribbons 24 and 26 by the cutting apparatus 20. Appropriate means may be provided below the cutting apparatus 20 for collecting the sealed bags without damage thereto. The embodiment 10 thus operates continuously in sequential fashion to form a series of identical bags.

The preforming of the ribbons 24 and 26 over the nipping rollers 30 and 32, respectively, holds the ribbons substantially out of contact with the fill tube 42 and causes them to assume the contour of the relieved area 132 on the platen face 124. The ribbons are thus able to be sealed together to form the desired bag shape which is substantially wrinkle free and thus able to hold a substantial amount of material without being unduly stressed or weakened. As described above, the lower rollers 34 and 36 are preferably provided with recessed areas having axial cross sections which are less than the corresponding cross section of the recesses in the rollers 30 and 32. The rollers 34 and 36 operate to force a portion of the material within the bags upwardly toward the open ends thereof to expel unwanted air from the bags prior to sealing their open ends. The bags are thus formed and sealed with no more than a minimum of air trapped therein. This feature is particularly important when forming bags to be placed within blood bags, since trapped air can have a deleterious affect on the blood.

To place the apparatus of the present invention in operation, the supply rollers 28 are filled with rolls of membrane ribbons and the container 148 is filled with the material to be packaged. The bolts 82 of the roller 32 and the bolts 110 of the roller 36 are then loosened, and the rollers 32 and 36 are swung away from the rollers 30 and 34, respectively, to enable the ribbons 24 and 26 to be threaded through the apparatus and pulled taught. After the ribbons are threaded, the rollers 32 and 36 are swung back to tightly nip the ribbons and the bolts 82 and 110 are tightened. The apparatus may then be put through one full cycle of operation to be sure that no feeding problems develop, after which the machine is ready for continuous operation.

It will be understood that the various actuating elements described in relation to embodiment 10 need not be precisely as described, but may incorporate any other actuating means well known in the art. For instance, the stepping motor 116 used to control the advancement of the two pairs of nipping rollers need not be an electric stepping motor but can be a pneumatic or hydraulic motor serving the same purpose and operating in essentially the same way. The double-acting piston and cylinder assemblies 40, 152 and 206 may likewise comprise solenoid plunger assemblies or any other conventional mechanisms.

It will also be understood that the apparatus of the present invention can be easily modified to advance the ribbons 24 and 26 continuously rather than intermittently, without departing from the spirit of the present invention. The platen arrangements 38 are then made to move downwardly with the ribbons during the sealing process as they engage the ribbons, and are returned upwardly to their initial position after being retracted from the ribbons. This motion can, for example, be accomplished by mounting the entire ribbon sealing apparatus 16 of the embodiment 10 to a carriage actuable vertically in reciprocating fashion by one or more cam elements.

The injection means 150 may alternatively be adapted to reciprocate the fill tube 42 in a vertical direction between the nipping rollers 30 and 32, depending on the length of the bag to be filled and the properties of the material injected into the bag. Mechanisms for accomplishing this are known in the art and will therefore not be discussed in detail herein.

From the above, it can be seen that there has been provided a new and improved apparatus for forming and filling packages from two ribbons of a thin flexible material such as a polycarbonate membrane. The membranes are preformed to a general tubular shape to avoid damaging the material during the package forming and filling operation and to produce substantially wrinkle-free bags able to hold substantial amounts of a material without rupture. The bags thus filled and sealed also contain no more than a minimum of trapped air.

Those skilled in the art may find variations and adaptations of the present invention and the appended claims are intended to cover all such variations and adaptations falling within the true scope and spirit of the invention.

I claim:

1. Apparatus for packaging a substance in closed bags formed from two continuous ribbons of a thin, fragile material comprising:

first and second rollers directed along a first horizontal plane and circumferentially engageable in opposed nipping relationship at axially outer end portions thereof to confine two ribbons therebetween, at least one of said rollers having a generally smooth annular concave portion extending between said end portions, the two ribbons approaching said first and second rollers generally horizontally from opposite sides thereof with each of the ribbons passing over and partially around one of said rollers to a first location between said rollers, whereupon the ribbons are brought face to face with one another and nipped in that condition between the axially outer end portions of said first and second rollers;

third and fourth rollers directed along a second horizontal plane and spaced beneath said first and second rollers, said third and fourth rollers circumferentially engageable in opposed nipping relationship at axially outer end portions thereof with at least one of said rollers having a generally cylindrical portion of reduced diameter extending between said end portions thereof, the ribbons passing downwardly from said first and second rollers to a second location at which the ribbons are nipped between the axially outer end portions of said third and fourth rollers;

means for controlling the rotation of said rollers about their respective axes to advance the ribbons in a desired manner from said first location to said second location as the ribbons are held taught therebetween;

means for tensioning the two ribbons above said first location in a direction away from said first location, pulling each of the ribbons over a different one of said first and second rollers and pulling at least one of the ribbons into said at least one concave portion to preform the unsealed combination of the ribbons at said first location and for a substantial distance therebelow into a generally tubular shape;

means for sealing the ribbons to each other as the ribbons pass from said first location to said second location, forming a bag open at the top from a portion of the ribbons and subsequently sealing said top to close the bag after the ribbons have advanced a downwardly predetermined distance, said sealing means operating on successive portions of the ribbons as the ribbons advance toward said second location to form a series of sealed bags; and means for introducing a substance directly into each of the open bags, comprising a conduit extending downwardly between said first and second rollers in the space formed by said at least one concave portion, said conduit located between and generally spaced from the preformed ribbons to prevent damage thereto, and means for causing a predetermined amount of the substance to pass from said conduit to each of the bags between the time of bag formation and that of sealing.

2. The packaging apparatus recited in claim 1 wherein said generally smooth annular concave portion of said at least one of said first and second rollers is relatively broad and shallow in axial cross-section, with a gradually curving contour.

3. The packaging apparatus recited in claim 1 wherein said means for controlling roller rotation to advance the ribbons includes means for continuously advancing said ribbons; and said sealing means comprises tow platens located oppositely about said ribbons and parallel thereto between said first and second locations, said platens actuable toward each other to seal the ribbons together along at least one seal line by sandwiching the ribbons in sealing relation therebetween.

4. The packaging apparatus recited in claim 1 wherein said means for controlling roller rotation to advance the ribbons includes means for intermittently advancing said ribbons a preselected amount; and said sealing means comprises two platens located oppositely about said ribbons and parallel thereto between said first and second locations, said platens actuable toward each other between advancements of the ribbons to seal the ribbons together along at least one seal line by sandwiching the ribbons in sealing relation therebetween.

5. The apparatus recited in claim 4 wherein said introduction means includes means for producing axial reciprocation of said conduit in timed relation with the actuation of said platens to extend the reach of said conduit during injection without interfering with the operation of said platens.

6. The packaging apparatus recited in claim 4 wherein at least one of said platens includes a sealing portion defining an upper sealing line and a lower sealing line, said upper line defining a "U"-shaped open bag and said lower line defining a closure for a bag previously formed such that actuation of said platens toward each other simultaneously forms a new open bag from a portion of said ribbons between said platens and closes the opening in the bag formed by the previous actuation of said platens.

7. The packaging apparatus recited in claim 6 wherein:

said conduit extends downwardly between said platens, terminating at a point opposite the "U"-shape formed by said upper sealing line; and said sealing portion includes a recess on the surface facing the ribbons which extends from the upper end of said at least one of said platens downwardly into said "U"-shape formed by said upper line, said recess having a horizontal cross-section similar in area and general shape to the axial cross-section of the concave annular recess of said at least one of said first and second rollers such that said conduit is receivable in spaced relationship between said platens opposite the "U"-shape formed thereon for said platens in an actuated condition to seal the ribbons and said predetermined amount of the filling substance can be introduced into the open bag thus formed for the platens in that condition.

8. The packaging apparatus as recited in claim 6, in which at least one of said platens includes heat sealing means associated with said sealing lines.

9. The packaging apparatus recited in claim 1 wherein said means for causing a predetermined amount of the substance to pass to the bags includes piston and cylinder means for injecting the substance into the series of bags via said conduit.

10. The packaging apparatus recited in claim 9 wherein said introduction means includes means for agitating the substance in bulk prior to injection.

11. The packaging apparatus recited in claim 1 which includes means for separating the sealed bags below said second location by periodically cutting the portion of the ribbons between bags as the ribbons advance downwardly.

12. The packaging apparatus recited in claim 11 wherein said separating means comprises a knife blade oriented transversely across the ribbons and advanced toward the ribbons by automatically actuated wedge means.

13. The packaging apparatus recited in claim 1 wherein the annular recess formed in said at least one of said third and fourth rollers by said generally cylindrical portion of reduced diameter has an axial cross-sectional area less than the axial cross-sectional area of the annular recess formed in said at least one of said first and second rollers by said generally smooth annular concave portion such that a portion of the substance is forced upwardly within the open bags by said third and fourth rollers to expel air therefrom as the lower portion of an open bag containing the substance passes said second location, whereby the bags contain very little air at the time of sealing.

14. Apparatus for packaging a substance in closed bags formed from two continuous ribbons of a thin, fragile material comprising:

first and second rollers directed along a first horizontal plane and circumferentially engageable in opposed nipping relationship at axially outer end portions thereof to confine two ribbons therebetween, at least one of said rollers having a relatively broad and shallow annular concave portion extending between said end portions, the two ribbons approaching said first and second rollers generally horizontally from opposite sides thereof with each of the ribbons passing over and partially around one of said rollers to a first location between said rollers, whereupon the ribbons are brought face to face with one another and nipped in that condition between the axially outer end portions of said first and second rollers;

third and fourth rollers directed along a second horizontal plane and spaced beneath said first and second rollers, said third and fourth rollers circumferentially engageable in opposed nipping relationship at axially outer end portions thereof with at least one of said rollers having a generally cylindrical portion of reduced diameter extending between said end portions thereof, the ribbons passing downwardly from said first and second rollers to a second location at which the ribbons are nipped between the axially outer end portions of said third and fourth rollers, the annular recess formed in said at least one of said third and fourth rollers by said generally cylindrical portion of reduced diameter having an axial cross-sectional area less than the axial cross-sectional area of the annular recess formed in said at least one of said first and second rollers by said generally smooth annular concave portion;

means for controlling the rotation of said rollers about their respective axes to intermittently advance the ribbons in preselected increments from said first location to said second location as the ribbons are held taught therebetween;

means for tensioning the two ribbons above said first location in a direction away from said first location, pulling each of the ribbons over a different one of said first and second rollers and pulling at least one of the ribbons into said at least one cancave portion to preform the unsealed combination of the ribbons at said first location and for a substantial distance therebelow into a generally tubular shape;

means for periodically sealing the ribbons to each other as the ribbons pass from said first location to said second location, forming a bag open at the top from a portion of the ribbons and subsequently sealing said top to close the bag after the ribbons have advanced a downwardly predetermined distance, said sealing means comprising two platens located oppositely about said ribbons and parallel thereto between said first and second locations and actuable toward each other between advancements of the ribbons to seal the ribbons together along at least one seal line by sandwiching the ribbons in sealing relation therebetween, means for introducing a substance directly into each of the open bags, comprising:

a conduit extending downwardly between said first and second rollers in the space formed by said at least one concave portion, said conduit located between and generally spaced from the preformed ribbons to prevent damage thereto; and piston and cylinder means for injecting a predetermined amount of the substance into each of the bags via said conduit between the time of bag formation and that of sealing.

15. The packaging apparatus recited in claim 14 wherein at least one of said platens includes a sealing portion defining an upper sealing line and a lower sealing line, said upper line defining an open bag and said lower line defining a closure for a bag previously formed such that actuation of said platens toward each other simultaneously forms a new open bag from a portion of said ribbons between said platens and closes the opening in the bag formed by the previous actuation of said platens.

16. The packaging apparatus recited in claim 15 wherein:

said conduit extends downwardly between said platens, terminating at a point opposite the "U"-shape formed by said upper sealing line; and said sealing portion includes a recess on the surface facing the ribbons which extends from the upper end of said at least one of said platens downwardly into said "U"-shape formed by said upper line, said recess having a horizontal cross-section similar in area and general shape to the axial cross-section of the concave annular recess of said at least one of said first and second rollers such that said conduit is receivable in spaced relationship between said platens opposite the "U"-shape formed thereon for said platens in an actuated condition to seal the ribbons and said predetermined amount of the filling substance can be introduced into the open bag thus formed for the platens in that condition.

17. The packaging apparatus recited in claim 16 which includes means for separating the sealed bags below said second location by periodically cutting the portion of the ribbons between bags as the ribbons advance downwardly, including a knife blade oriented transversely across the ribbons and advanced toward the ribbons by automatically actuated wedge means.

* * * * *